(12) United States Patent
Goffinet et al.

(10) Patent No.: US 8,160,969 B2
(45) Date of Patent: Apr. 17, 2012

(54) SYSTEM AND METHOD FOR ORDERING CONSUMABLES

(75) Inventors: Kevin Patrick Goffinet, Lexington, KY (US); Timothy Scott Seevers, Nicholasville, KY (US)

(73) Assignee: Lexmark International, Inc., Lexington, KY (US)

( * ) Notice: Subject to any disclaimer, the term of this patent is extended or adjusted under 35 U.S.C. 154(b) by 514 days.

(21) Appl. No.: 11/852,743

(22) Filed: Sep. 10, 2007

(65) Prior Publication Data

US 2009/0070227 A1    Mar. 12, 2009

(51) Int. Cl.
G06Q 10/00    (2012.01)
(52) U.S. Cl. .................. 705/305; 705/26.1; 705/27.1
(58) Field of Classification Search ............ 705/26, 705/27, 30, 26.1–27.25
See application file for complete search history.

(56) References Cited

U.S. PATENT DOCUMENTS

| | | |
|---|---|---|
| 6,947,155 B2 | 9/2005 | Haines |
| 2002/0071685 A1 | 6/2002 | Haines |
| 2002/0072998 A1 | 6/2002 | Haines et al. |
| 2002/0073130 A1 | 6/2002 | Haines et al. |
| 2002/0186406 A1 | 12/2002 | Phillips et al. |
| 2003/0072027 A1 | 4/2003 | Haines et al. |
| 2003/0074268 A1 | 4/2003 | Haines et al. |
| 2003/0074427 A1 | 4/2003 | Haines et al. |
| 2003/0074428 A1 | 4/2003 | Haines |
| 2003/0074442 A1 | 4/2003 | Haines |
| 2003/0074547 A1 | 4/2003 | Haines |
| 2003/0103233 A1 | 6/2003 | Struble |
| 2004/0090647 A1 | 5/2004 | Beard et al. |
| 2004/0111699 A1 | 6/2004 | Rockwell |
| 2004/0125403 A1 | 7/2004 | Furst et al. |
| 2004/0128375 A1 | 7/2004 | Rockwell |
| 2004/0184066 A1 | 9/2004 | Urabe |
| 2004/0187028 A1 | 9/2004 | Perkins et al. |
| 2004/0204977 A1 * | 10/2004 | Obert ............................ 705/8 |
| 2004/0246520 A1 | 12/2004 | Obert |
| 2005/0004974 A1 | 1/2005 | Sharma et al. |
| 2005/0068562 A1 | 3/2005 | Ferlitsch |
| 2005/0099646 A1 | 5/2005 | Jeyachandran et al. |
| 2005/0117918 A1 | 6/2005 | Kimura et al. |
| 2005/0190398 A1 | 9/2005 | Nuggehalli et al. |
| 2005/0240518 A1 | 10/2005 | Ishizuka |
| 2008/0101569 A1 * | 5/2008 | Decker ..................... 379/114.2 |

OTHER PUBLICATIONS

"Cartridge World Supplies a 'Green' Solution to Kodak Printers" U.S. Newswire. Washington: Feb. 7, 2007. Retrieved via Proquest on Dec. 5, 2011.*

* cited by examiner

Primary Examiner — Michael Misiaszek

(57) ABSTRACT

A system for ordering consumables includes a peripheral device that utilizes at least one consumable, an entitlement system established between a user of the peripheral device and a supplier of at least one consumable, wherein the user pre-purchases a quantity of at least one consumable from the supplier for subsequent delivery on an as-needed basis and the peripheral device being adapted to communicate with the supplier to request delivery of at least one consumable pursuant to the entitlement system.

18 Claims, 2 Drawing Sheets

SYSTEM AND METHOD FOR ORDERING CONSUMABLES

BACKGROUND

This application relates to the supply and ordering of consumables and, more particularly, to systems and methods for ordering consumables directly from the operating panel of a printer or multifunction device.

Peripheral devices, such as printers, scanners, facsimile machines, multi-function peripherals (MFPs) and the like typically are used in the office environment for performing various tasks, such as printing, copying and/or scanning, and therefore may require a constant supply of various consumables. For example, the printing and copying functions of an MFP typically require a constant supply of paper and toner. As the MFP consumes the paper and toner, a user must re-supply the device with additional paper and toner.

A peripheral device may become inoperative temporarily with respect to certain functions (e.g., printing) if no consumables are available to re-supply the device. Typically, the downtime associated with the absence of the necessary consumables results in an inability to perform essential business tasks and potentially may lead to a loss of time and money.

Ordering consumables is often a cumbersome and time-consuming task. For example, ordering consumables may require a user to search the internet, search various catalogues, prepare order forms, make telephone calls and/or travel to a supply store. Furthermore, once a user is ready to make a purchase, the wrong types of products might be purchased.

Some users have attempted to overcome the problems associated with purchasing consumables by purchasing large stocks of such consumables and storing or warehousing them until needed. However, such an approach has many disadvantages, including, for example, the need for a large and potentially expensive space for storing the extra consumables, the potential that the stored consumables may degrade before being used, and the possibility that supplies may be lost or forgotten and never used.

Accordingly, there is a need for a system and method for ordering consumables, as needed, directly from the operating panel of a printer or multi-function device.

SUMMARY

In one aspect, a system for ordering consumables includes a peripheral device that utilizes at least one consumable, an entitlement system established between a user of the peripheral device and a supplier of at least one consumable, wherein the user pre-purchases a quantity of the at least one consumable from the supplier for subsequent delivery on an as-needed basis and the peripheral device is adapted to communicate with the supplier to request delivery of at least one consumable pursuant to the entitlement system.

In another aspect, a method for ordering a consumable is provided and includes establishing an entitlement system wherein a user of a peripheral device pre-purchases a predetermined quantity of a consumable from a supplier for subsequent delivery on an as-needed basis, the peripheral device subsequently communicating a request for at least one of the pre-purchased consumables to the supplier and, in response to the request, the supplier providing at least one of the pre-purchased consumables pursuant to the entitlement system.

In another aspect, a method for ordering a consumable is provided and includes establishing an entitlement system wherein a user of a peripheral device pre-purchases a predetermined quantity of a consumable from a supplier for subsequent delivery on an as-needed basis, the peripheral device subsequently determining that a quantity of a consumable being consumed by the device has fallen below a predetermined threshold value and communicating a request from the device to the supplier for at least one of the pre-purchased consumables maintained by the supplier pursuant to the entitlement system, and in response to the request, providing the requested consumable.

Other aspects of the system and method for ordering consumables will become apparent from the following description, the accompanying drawings and the appended claims.

DETAILED DESCRIPTION

Figure 1:
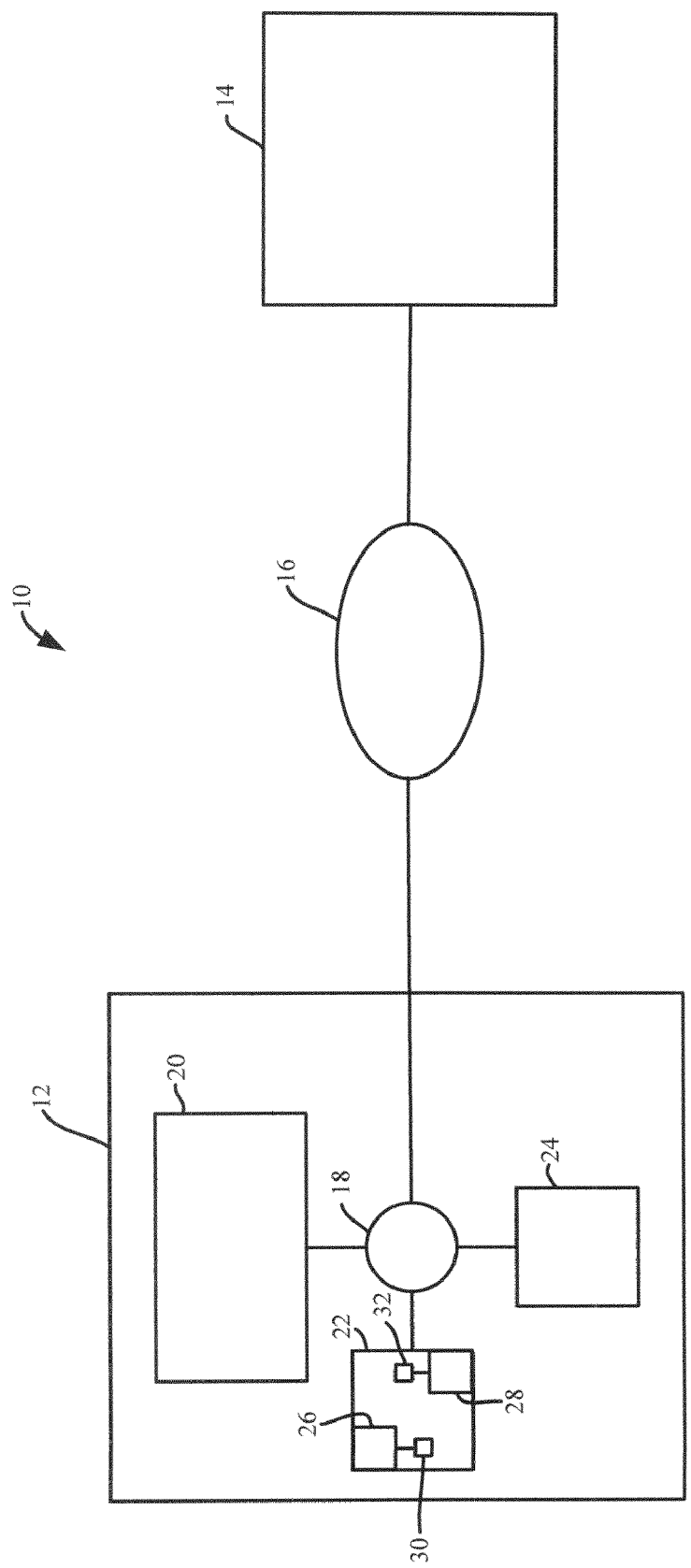
FIG. 1 is a block diagram of one aspect of a system for ordering consumables.

As shown in FIG. 1, one aspect of a system for ordering consumables, generally designated 10, may include a peripheral device 12, in communication with a supplier 14 over a network 16. The network 16 may be a public switched telephone network (PSTN), which may include a wireless or landline component, a local area network, a wide area network, the internet, an intranet or a combination thereof.

The device 12 may be a printer, a copier, a scanner, an all-in-one (AIO) device, an MFP or the like. In one aspect, the device 12 may include a processor 18 in communication with a user interface 20, a print engine 22 and a scanning subsystem 24. The print engine 22 may include a paper supply 26 and a toner supply 28. A sensor 30 may be provided to monitor the paper supply 26 and send a signal to the processor 18 indicative of the paper supply, such as when the paper supply 26 has been exhausted or is in a "low" state. A sensor 32 may be provided to monitor the toner supply 28 and send a signal to the processor 18 indicative of the toner supply, such as when the toner supply 28 has been exhausted or is in a "low" state.

The user interface 20 may be a graphical user interface, a monitor, a series of buttons, a touch-sensitive display panel, voice-activated interface, a speaker or the like. In one aspect, the user interface 20 may serve as an operating panel for the device 12. It is also within the scope of this aspect to utilize a computer, such as personal computer, having a monitor as the interface 20.

Those skilled in the art will appreciate that the multi-function device 12 may include various additional components, such as a facsimile, a copier or a card reader, and may use various consumables, such as ink, toner, paper and other media. All consumables capable of being sensed or monitored are contemplated herein.

The supplier 14 may be any device, system, process, person (other than a user of the device 12), organization or the like capable of communicating with, or receiving communications from, the device 12. In one aspect, the supplier 14 may maintain, warehouse, order, request, supply, ship and/or facilitate the order, storage, supply and shipment of consumables. For example, the supplier 14 may be a manufacturer, retailer or wholesaler of multi-function devices and/or associated consumables and may supply a user with consumables when requested. In one aspect, as described in greater detail below, the supplier 14 may supply consumables for use by the device 12 when requested by the device.

In one aspect, the supplier 14 may provide consumables according to an entitlement system. The entitlement system may allow a user to pre-purchase a certain quantity of consumables and the supplier 14 may facilitate shipment of the consumables as necessary. For example, a user may pre-purchase 50 reams of paper and 15 toner cartridges. The user may initially take 1 ream of paper and 1 toner cartridge, leaving the paper entitlement at 49 and the toner entitlement at 14. In one aspect, the balance of the entitlement may be maintained (e.g., warehoused) by the supplier 14. As the user requires additional paper or toner cartridges, the user may notify the supplier 14 and the supplier 14 may ship the paper and/or toner to the user and deduct the appropriate quantity from the entitlement total.

Further, a receipt may be issued each time a deduction is made from the entitlement total. For example, the device 12 may be instructed to print a receipt when the device 12 requests consumables from the entitlement and/or when a deduction is made from the entitlement total.

Figure 2:
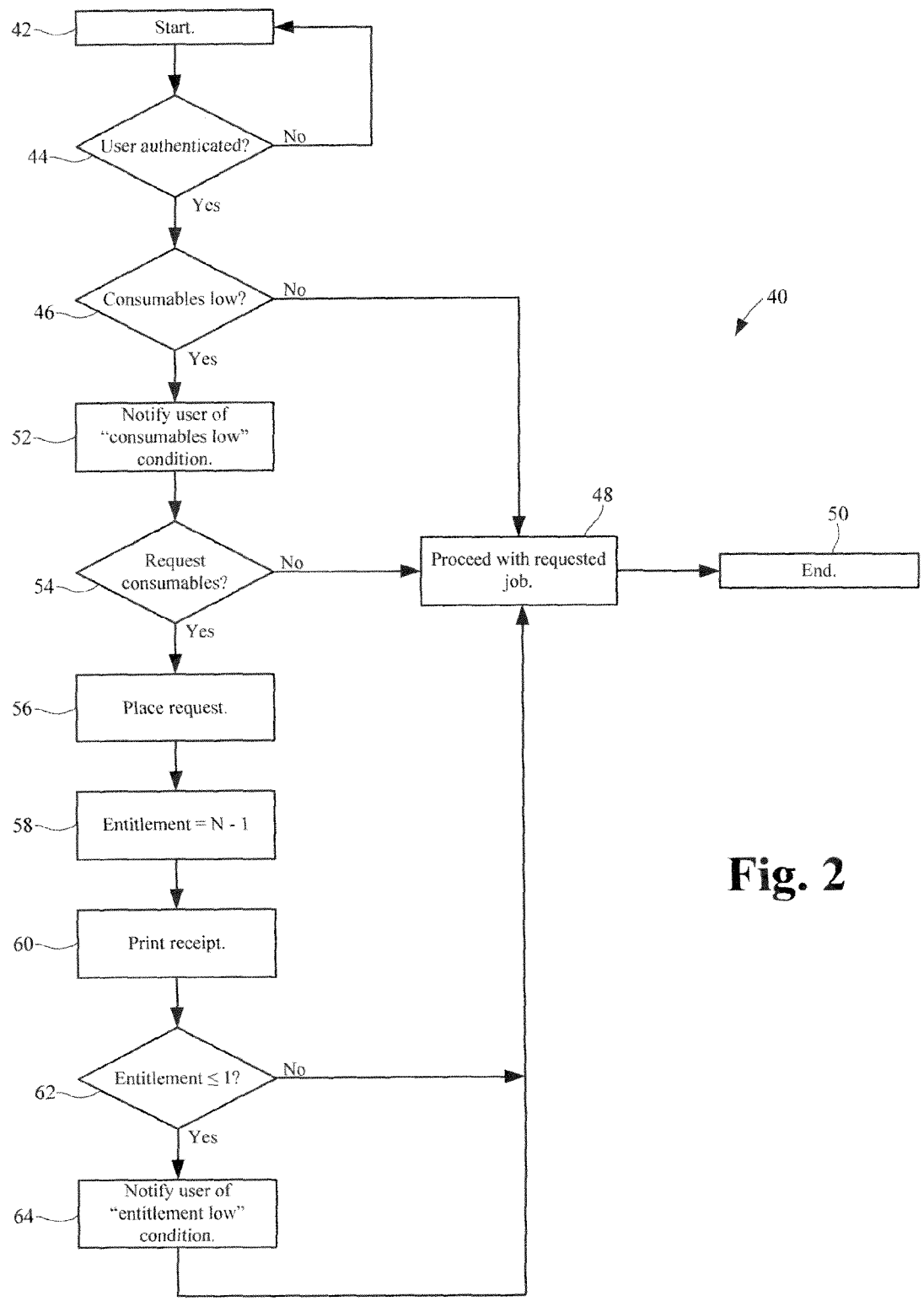
FIG. 2 is a flow chart of another aspect of a system and method for ordering consumables.

The device 12 may be adapted to allow a user to request additional consumables directly from the user interface 20 of the device 12. One aspect of such a process is illustrated in FIG. 2 and is generally designated 40. The process 40 may begin at block 42 when a user initiates a job at the device 12. As used herein, the term "job" refers to any function of the device 12, including without limitation, printing, copying, receiving or transmitting facsimiles or other electronic data, scanning or storing or retrieving documents, images or data locally or over a network.

In one aspect, prior to performing a job or proceeding with the process 40, the device 12 may authenticate the user, as shown at block 44. The authentication may be based upon a username/password, a radio frequency identification (RFID) card, a physical key, a biometric process (e.g., finger print scan) or the like. The authentication may be directed to the use of the device 12 and/or to determine whether the user has the authority required to request additional consumables from the supplier 14.

At block 46, the processor 18 may determine whether any of the consumables (e.g., the paper supply 26) are exhausted or at a "low" state. The determination may be made by communicating with the sensors 30, 32 or by any available means. When no "low" or exhausted state is detected, the device 12 may proceed with the requested job (block 48) and the process may come to an end (block 50).

When a "low" or exhausted state of consumables is detected, the device 12 may notify the user of the condition, as shown at block 52. The notification may be communicated to the user in any one or more of a variety of ways, such as by displaying notice on the user interface 20 of the device 12 or printing a notification using the print engine 22 of the device 12.

In one aspect, the device 12 may automatically request consumables from the supplier 14. In another aspect, the device may prompt the user to request consumables from the supplier 14, as shown at block 54. For example, when the toner supply 26 is low, the user may be prompted, by way of the user interface 20, as follows: "Toner is low. Request a toner cartridge from the supplier? Yes or No?" If the user chooses the "No" option, the device 12 may proceed with the requested job, as shown at block 48, and the process 40 may come to an end, as shown at block 50. If the user chooses the "Yes" option, the device 12 may request a toner cartridge from the supplier 14 over the network 16, as shown at block 56. When consumables are requested from the supplier 14, the entitlement total may be adjusted, as shown at block 58. For example, when one toner cartridge is requested from the supplier 14, one toner cartridge is deducted from the entitlement total.

As shown at block 60, the device 12 may print a receipt confirming that a toner cartridge was requested. In one aspect, the receipt may indicate the user's entitlement total (e.g., the number of pre-paid toner cartridges remaining with the supplier 14).

As shown at block 62, when the entitlement total for a particular consumable falls at or below a predetermined value (e.g., there are only 0, 1 or 2 pre-paid toner cartridges remaining), the user may be notified, as shown at block 64. In one aspect, the device 12 may prompt the user to purchase additional consumables with the supplier 14 pursuant to the entitlement system.

When the consumables have been requested and the entitlement total addressed, the device 12 may proceed with the requested job, as shown at block 48, and the process 40 may come to an end, as shown at block 50.

Accordingly, the disclosed system and method for ordering consumables allows a user to order various consumables directly at the user interface of the device 12, as the consumables are needed, without the need for making multiple payments or maintaining a large inventory of consumables.

Although various aspects of the system and method for ordering consumables have been shown and described, modifications may occur to those skilled in the art upon reading the specification and any patent that may issue on this application includes such modifications and is limited only by the scope of the claims.

What is claimed is:

1. A system for ordering pre-purchased consumables comprising:
   a peripheral device capable of printing that utilizes at least one consumable;
   an entitlement system established between a user of said peripheral device and a supplier of at least one pre-purchased consumable, wherein said supplier maintains a number of said at least one pre-purchased consumable for subsequent delivery to said user on an as-needed basis;
   said peripheral device automatically communicating with said supplier to request delivery of said at least one pre-purchased consumable pursuant to said entitlement system when said consumable utilized by said peripheral device is at a low state;
   said entitlement system reducing said number of said pre-purchased consumables yet to be delivered by said supplier when said supplier performs said requested delivery of said at least one pre-purchased consumable to said user pursuant to said entitlement system; and
   said peripheral device notifying said user of said device when said number of said pre-purchased consumables maintained by said supplier falls below a predetermined threshold value,
   wherein said at least one pre-purchased consumable is purchased prior to notification that said consumable is at said low state.

2. The system of claim 1 wherein said peripheral device is selected from the group consisting of a printer, a scanner, a facsimile machine, an all-in-one device and a multi-function peripheral.

3. The system of claim 1 wherein said consumable is at least one of a paper and a toner.

4. The system of claim 1 wherein said peripheral device includes at least one sensor adapted to monitor a quantity of said consumable.

5. The system of claim 1 wherein said peripheral device includes a user interface.

6. The system of claim 5 wherein said user interface is adapted to notify said user of said peripheral device that a quantity of said consumable utilized by said peripheral device is at said low state.

7. The system of claim 1 further comprising a network, wherein said peripheral device is adapted to communicate with said supplier over said network.

8. The system of claim 1 wherein said supplier is at least one of a manufacturer of said consumable, a retailer of said consumable and a wholesaler of said consumable.

9. The system of claim 1 wherein said request is automatic.

10. The system of claim 1 wherein said request is authorized by a user of said peripheral device.

11. A method for ordering a pre-purchased consumable from a supplier for a peripheral device capable of printing, comprising:
    establishing an entitlement system wherein a user of said peripheral device pre-purchases a predetermined number of consumable from said supplier for subsequent delivery on an as-needed basis;
    said peripheral device subsequently communicating a request for delivery of at least one of said pre-purchased consumables to said supplier when a consumable utilized by said peripheral device is at a low state;
    in response to said request, said supplier delivering at least one of said pre-purchased consumables to said user pursuant to said entitlement system;
    in response to said supplier delivering said requested pre-purchased consumable to said user, reducing said number of said pre-purchased consumables yet to be delivered by said supplier and notifying said user of said device when said number of said pre-purchased consumables yet to be delivered by said supplier falls below a predetermined threshold value.

12. The method of claim 11 further comprising subsequently pre-purchasing a second predetermined number of said consumable from said supplier pursuant to said entitlement system.

13. The method of claim 11 further comprising notifying a user when said quantity of said consumable utilized by said peripheral device falls below said predetermined threshold value.

14. The method of claim 11 wherein said supplier is at least one of a manufacturer of said consumable, a retailer of said consumable and a wholesaler of said consumable.

15. The method of claim 11 wherein said communicating step is performed over a network.

16. A method for ordering pre-purchased consumable from a supplier for use by a peripheral device capable of printing, comprising:
    establishing an entitlement system wherein a user of said peripheral device pre-purchases a predetermined number of said consumable from said supplier for subsequent delivery on an as-needed basis;
    said peripheral device determining that a quantity of a consumable being consumed by said device has fallen below a predetermined threshold value and subsequently communicating a request from said device to said supplier for delivery of at least one of said pre-purchased consumables maintained by said supplier to said user pursuant to said entitlement system;
    in response to said request, said supplier delivering said requested pre-purchased consumable to said user and reducing said number of said pre-purchased consumables yet to be delivered by said supplier; and
    said peripheral device notifying said user of said device when said number of said pre-purchased consumables yet to be delivered by said supplier falls below a predetermined threshold value.

17. The method of claim 1, said peripheral device providing a receipt upon confirmation that said at least one consumable was requested for delivery.

18. The method of claim 17, wherein said receipt indicates the remaining purchased consumables yet to be delivered by said supplier after said confirmation of said requested delivery of said at least one consumable.

* * * * *